Sept. 21, 1943.   H. H. BARNARD   2,329,686
DRAWING AND OBSERVING DEVICE
Filed Dec. 5, 1940   11 Sheets-Sheet 4
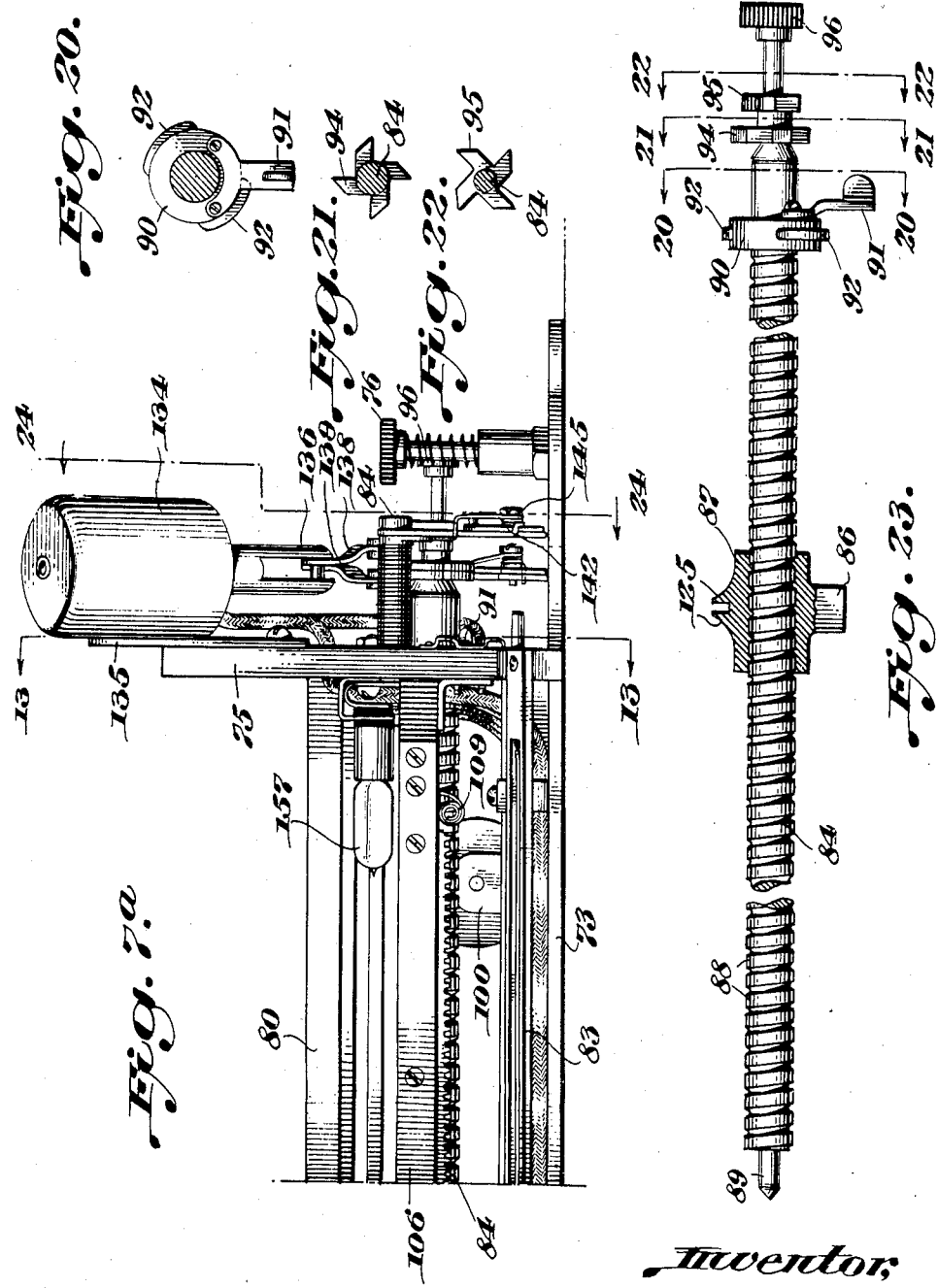
Inventor,
Henry H. Barnard
By Young, Emery & Thompson
Attys.

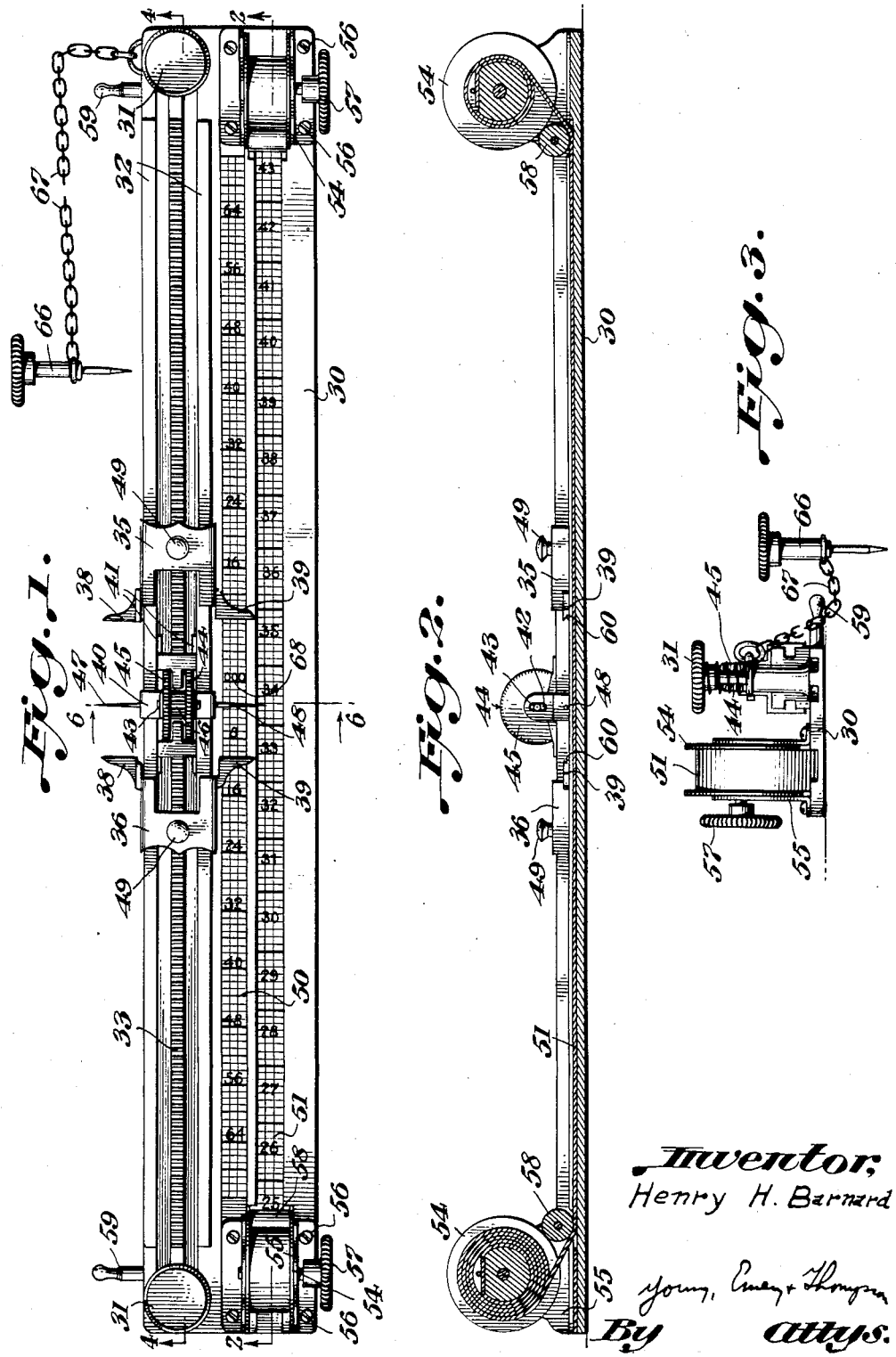

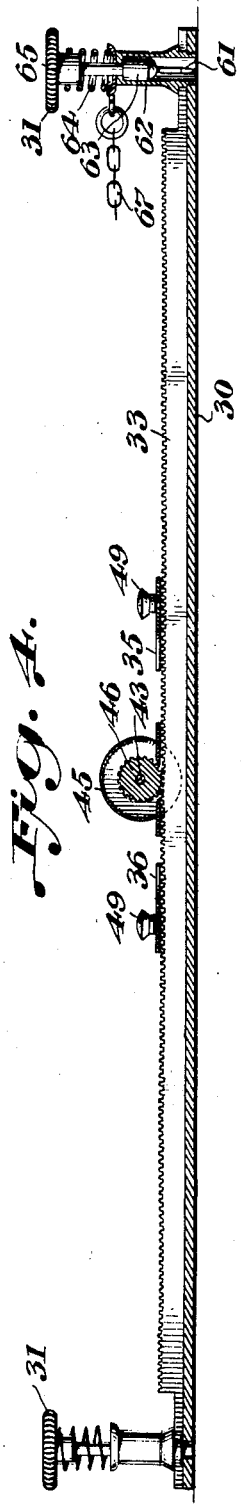

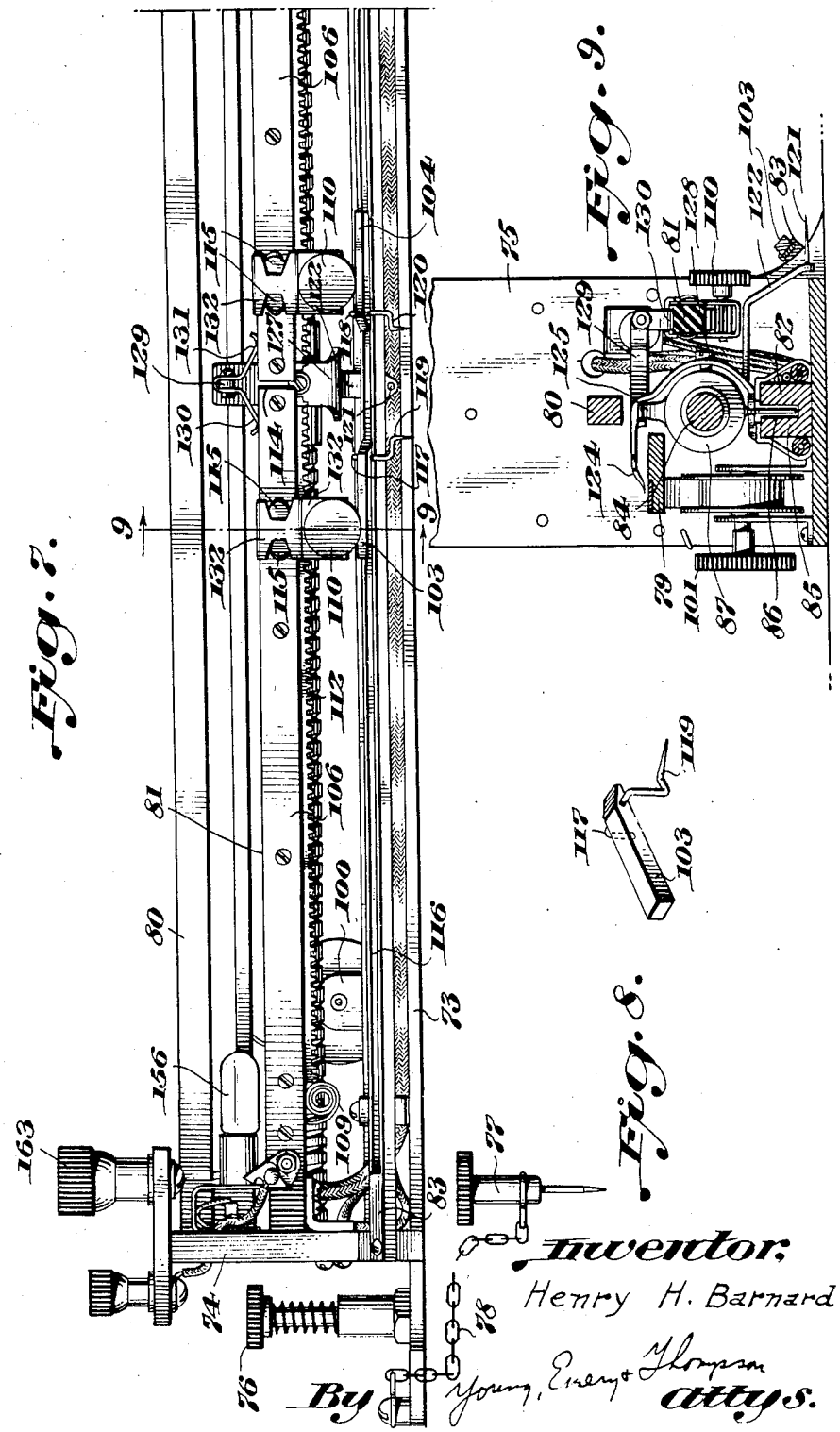

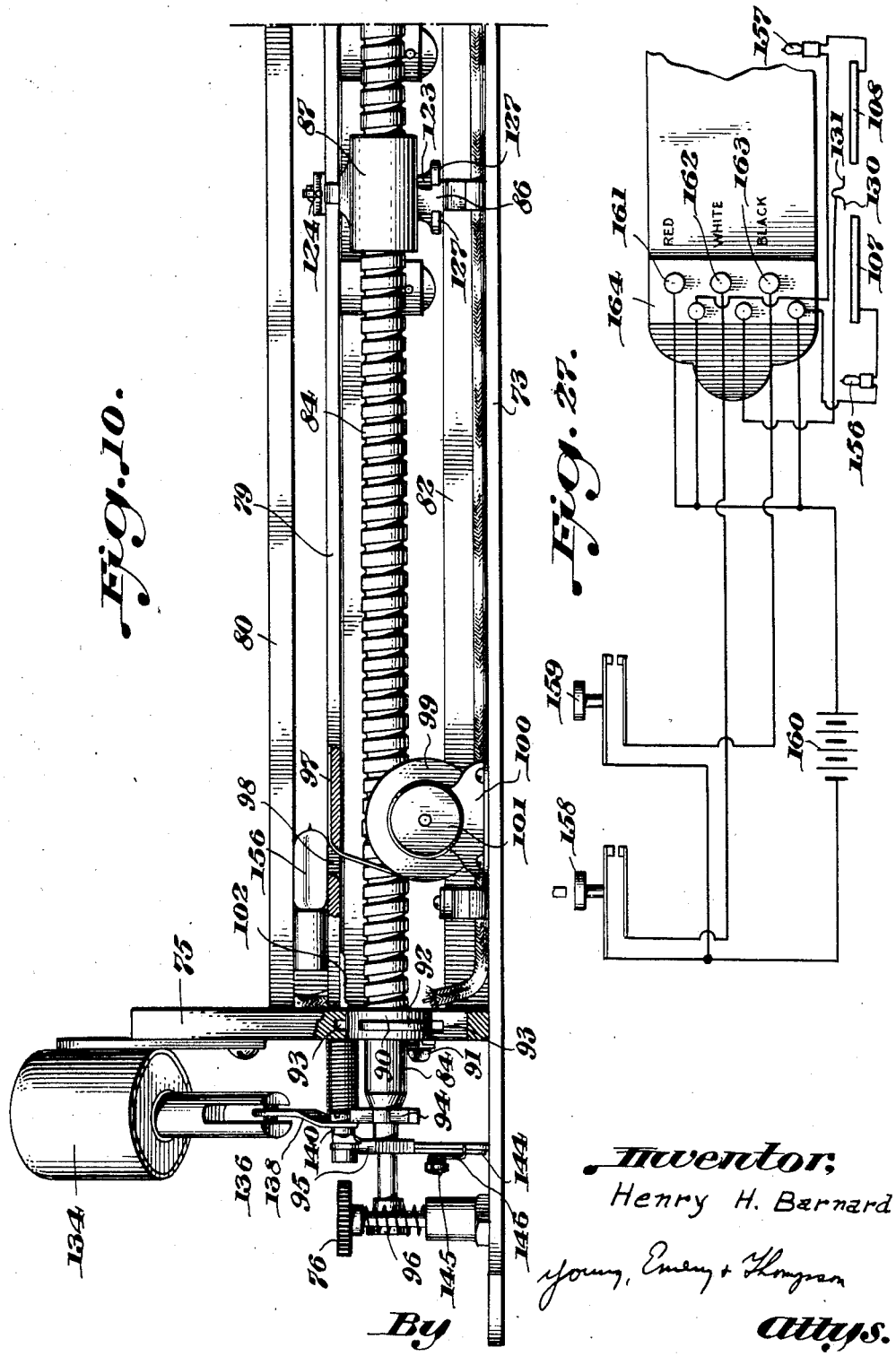

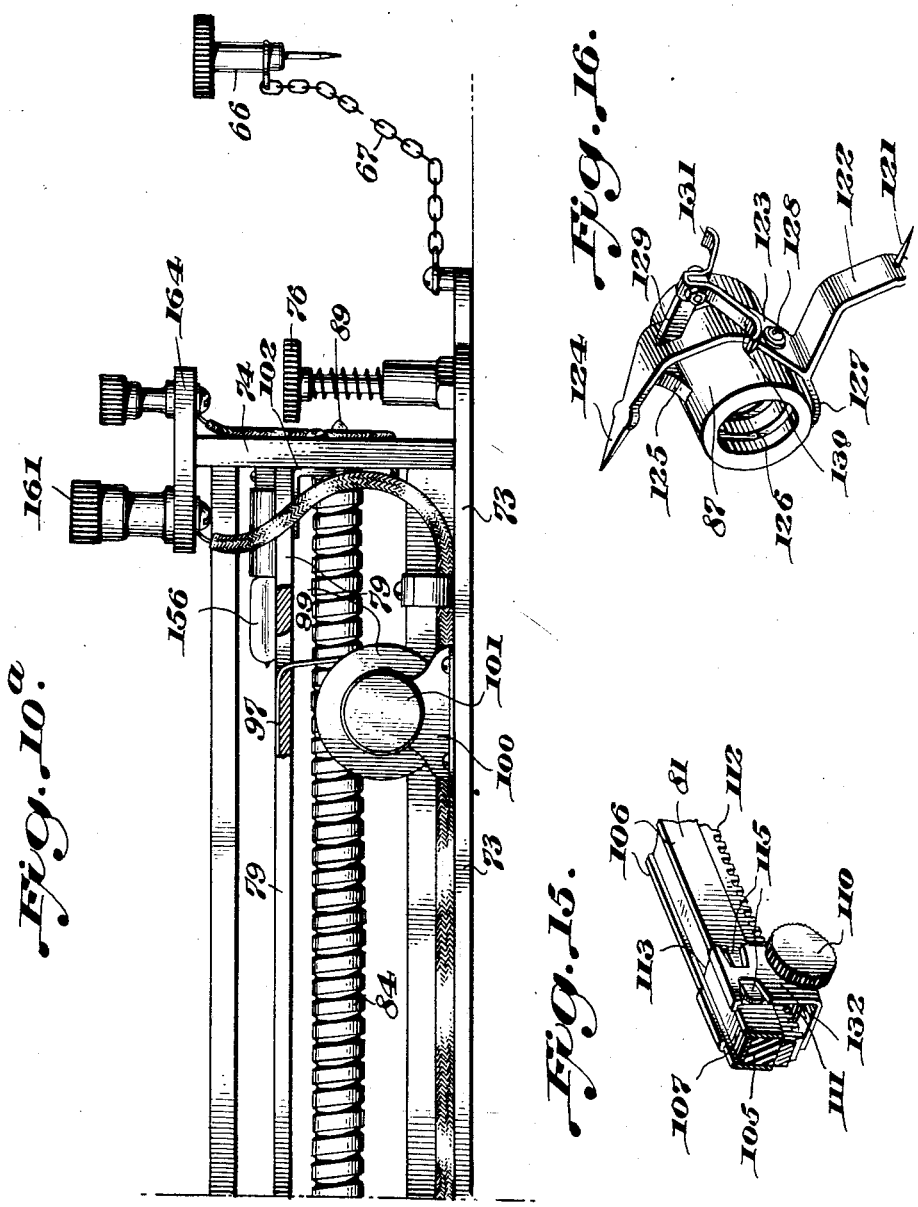

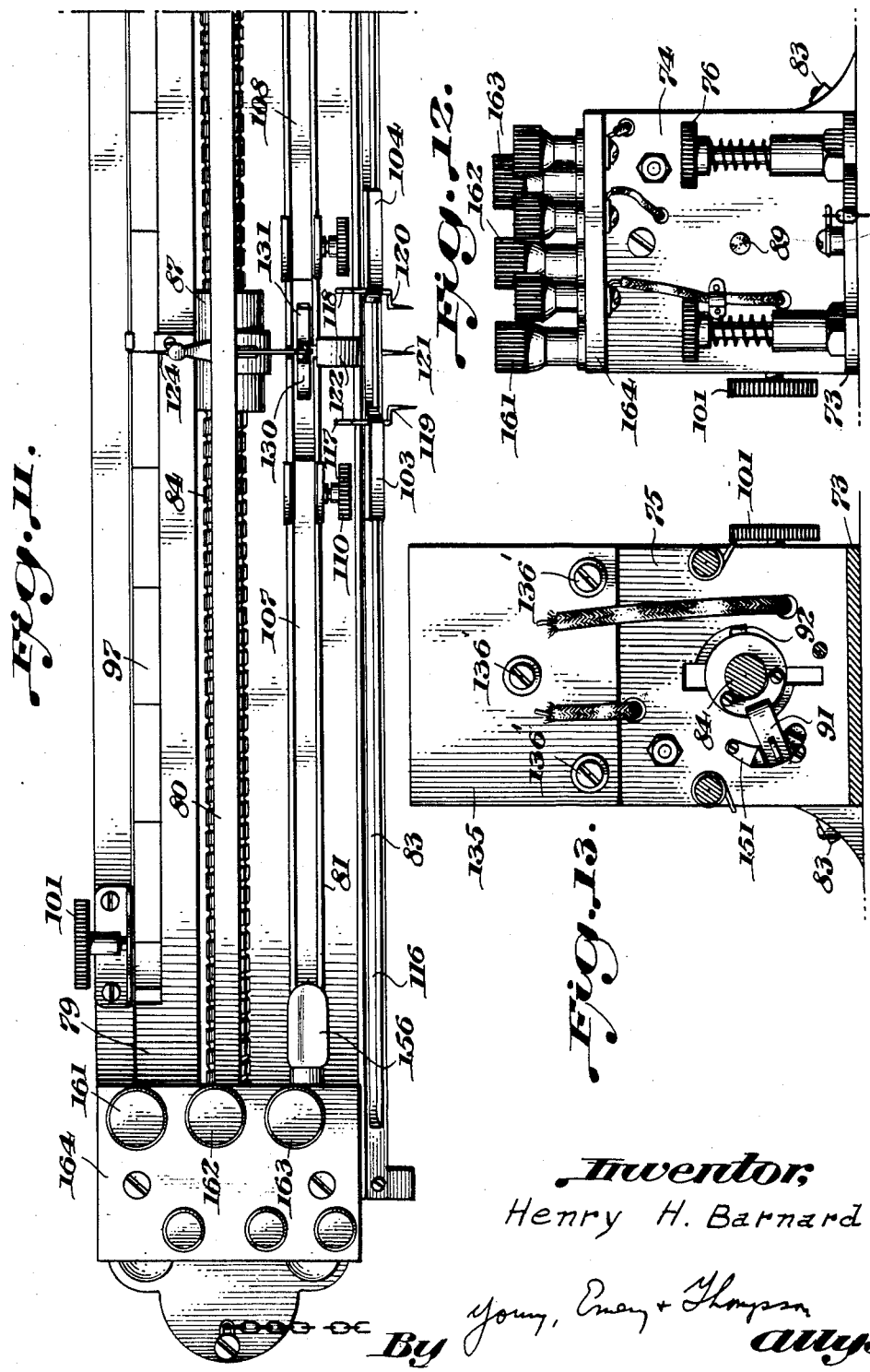

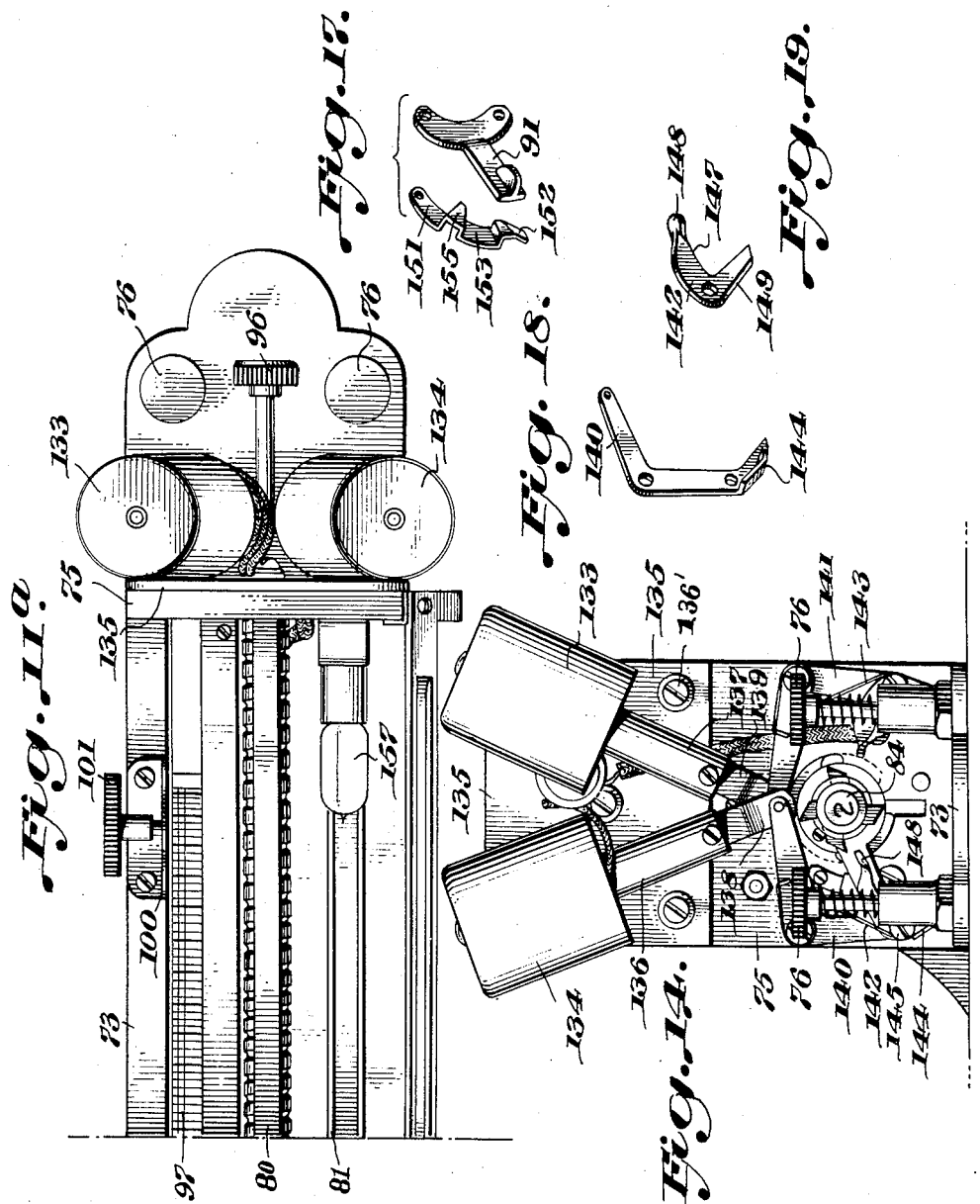

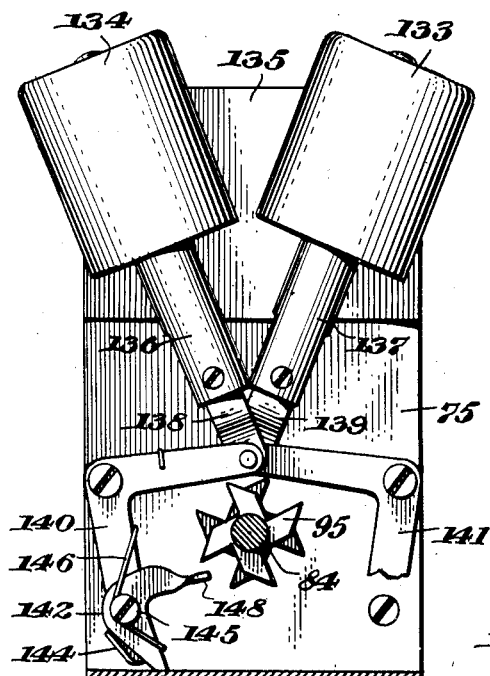
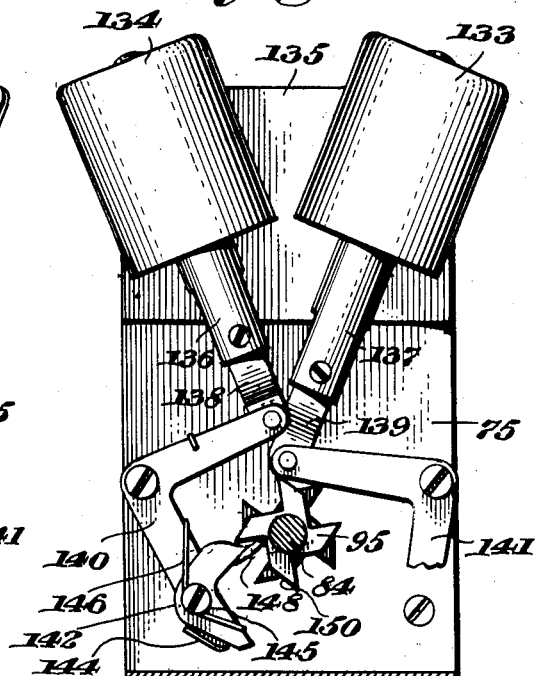
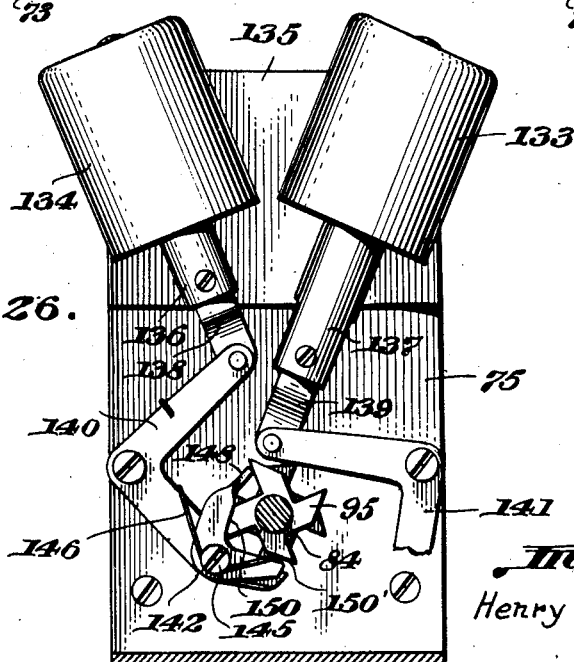

Sept. 21, 1943.  H. H. BARNARD  2,329,686
DRAWING AND OBSERVING DEVICE
Filed Dec. 5, 1940  11 Sheets-Sheet 10
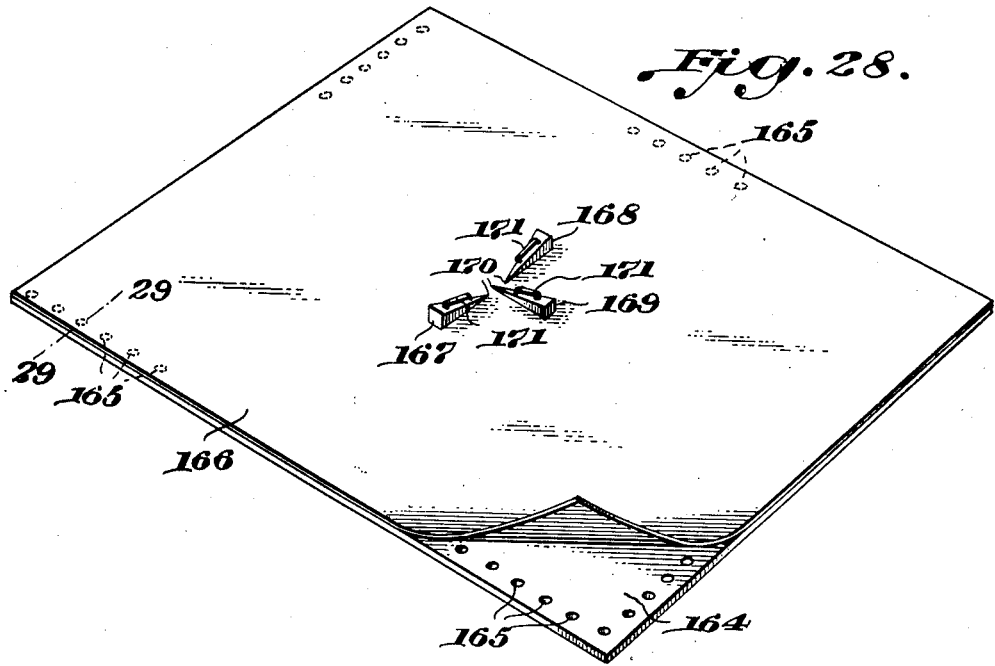
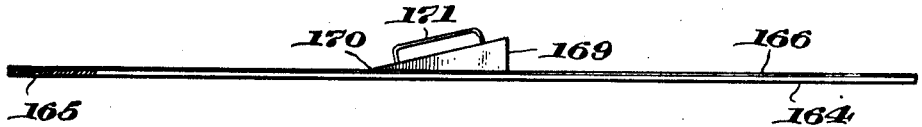
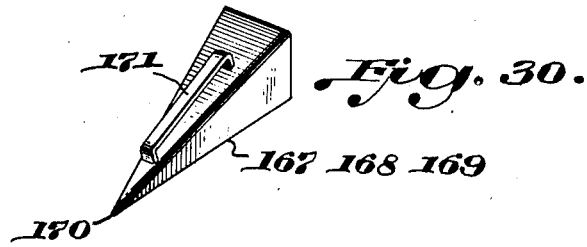
Inventor:
Henry H. Barnard
By Young, Emery & Thompson
attys.

Sept. 21, 1943.  H. H. BARNARD  2,329,686
DRAWING AND OBSERVING DEVICE
Filed Dec. 5, 1940  11 Sheets-Sheet 11
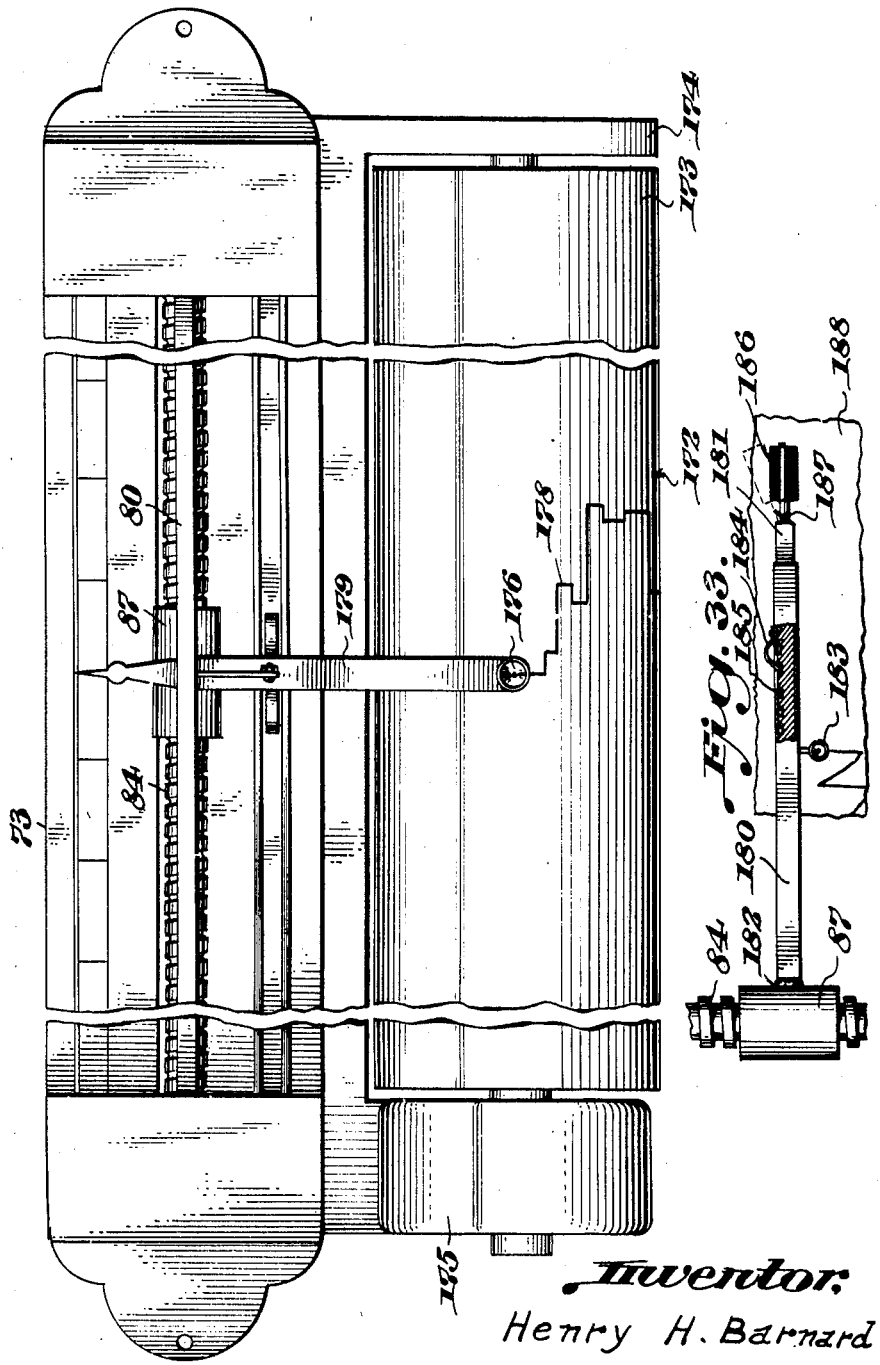
Inventor:
Henry H. Barnard
By Young, Emery & Thompson
attys.

Patented Sept. 21, 1943

2,329,686

UNITED STATES PATENT OFFICE 2,329,686

DRAWING AND OBSERVING DEVICE

Henry H. Barnard, Washington, D. C.

Application December 5, 1940, Serial No. 368,696

11 Claims. (Cl. 177—353)

The present invention relates to devices for precisely indicating in general changes of or actual values, functions of machines and materials and more specifically the sale prices of stocks, bonds, commodities, etc., whereby the range as well as volume or quotations of such items may be precisely observed and recorded. Hereinafter reference will only be had to transactions for stocks but it is understood that the invention is equally applicable to any item or function where it is desired to precisely observe and record fluctuations, volume and changes, in any unit of time and from day to day.

It is therefore an object of the invention to provide devices to set up and record stock market quotations, such as sale prices whereby the range of one or more or groups of stocks may be continuously and precisely indicated in cooperation, if desired, with a graph or diagram, upon receiving information of such quotations by a stock ticker, or by other means, so that at any time during a market session the devices will indicate and/or record the previous session's close or the opening price or sale as well as the high and low sales or prices. In this manner it is possible to follow the trend or range, that is, activity, of the market as the session progresses which will also be an indication of the support or non-support of the particular issue or issues of the market.

A still further object of this invention is to provide manual or electrically operated means, and the method, for precisely indicating by graph or diagram continuously from day to day the price of one or more stocks so that the trend or movement of the prices may be ascertained and compared as the market is in session and wherein means is provided for enabling the price at a given time of one or more stocks to be instantly observed and such price or prices compared with previous high and low prices.

A further object of this invention is to provide a machine for graphically indicating stock quotations wherein means or an indicating device is provided, preferably in the form of a scale representing fractional stock quotations and an indicator, for precisely and successively displaying or indicating the various price quotations of a stock and in which means is provided for operating the indicating device so as to display successive prices in the stock and at the same time for operating a graphical indicating mechanism to form a record or diagram embodying each change in price.

Further objects will be apparent from the following description taken in connection with the accompanying drawings showing various embodiments of the invention and in which;

Figure 1 is a plan view of a manually operable indicating device, or machine,

Fig. 2 is a longitudinal sectional view of the device taken on line 2—2 of Fig. 1 in the direction of the arrows, Fig. 3 is an end view of the device of Fig. 1, Fig. 4 is a longitudinal sectional view of the device taken on line 4—4 of Fig. 1 in the direction of the arrows, Fig. 5 is a side elevation of the device of Fig. 1, Fig. 6 is a cross section taken on line 6—6 of Fig. 1 in the direction of the arrows, Figs. 7 and 7a taken together is a side elevation of an electrically operable indicating device, Fig. 8 is a perspective view of the detail of a pointer slide, Fig. 9 is a cross section taken on line 9—9 of Fig. 7 in the direction of the arrows, Figs. 10 and 10a taken together is a side elevation of the other side of the device of Figs. 7 and 7a, Figs. 11 and 11a taken together is a plan view of the device of Figs. 7 to 10a.

Fig. 12 is an elevation of the left hand end of the device of Figs. 7 and 7a,

Fig. 13 is a cross section taken on line 13—13 of Fig. 7a in the direction of the arrows, Fig. 14 is an elevation of the right hand end of the device of Fig. 7a, Fig. 15 is a perspective view of a detail of the contact strip and its actuator together with its track, Fig. 16 is a perspective view of the center pointer assembly of the device of Figs. 7 to 14, Fig. 17 is a perspective view of two cooperating parts of a locking detail, Figs. 18 and 19 are perspective views of details of an escapement mechanism, Fig. 20 is a cross sectional view of a bayonet lock for an actuating rod taken on line 20—20 of Fig. 23, Figs. 21 and 22 are cross sections taken on lines 21—21 and 22—22 respectively of Fig. 23, Fig. 23 is a side elevation of the actuating rod, Figs. 24 to 26 are sectional views taken on line 24—24 of Fig. 7a showing three positions of the electro-magnetic escapement mechanism, Fig. 27 is a wiring diagram, Fig. 28 is a perspective view of a further modified indicating and recording device, Fig. 29 is a cross sectional view taken on line 29—29 of Fig. 28, Fig. 30 is a perspective view of a pointer of Figs. 28 and 29, Fig. 31 is a plan view of a portion of the graph paper sheet, Fig. 32 is a plan view of a modified form of the invention for continuous graphic recording, and Fig. 33 is a plan view of a modified continuous graphic recording device.

Referring to Figs. 1 to 6 the indicator is of the type which is manually operable. The instrument has all of its parts mounted on a base plate 30 having a spring-pressed fastening pin 31 at each end thereof to fasten the instrument on a board or other support where desired. The base plate 30 is provided at one side, Fig. 1, with a pair of spaced integral guide tracks 32 extending longitudinally along the plate and parallel to each other with a toothed rack 33 intermediate and parallel to the tracks. These tracks 32 have on one side a groove 34, Figs. 5 and 6, which acts as a guide for the indicating or marking sliders 35 and 36, of which there are two in number, and each slider extends over both tracks 32 bridging the intervening space including the rack 33 and is provided with an actuating knob 49. Also each slider has opposed laterally extending tongues 37, Fig. 6, which extend into the grooves 34 so that while the sliders can move easily they will not change their position or drop if the instrument is held or mounted in a vertical position. Each slider has a pair of oppositely extending pointed or marking edges 38 and 39, the purpose of which will be explained.

An intermediate slider or indicator 40, also slides and moves on the guide tracks 32 and has inwardly directed tongues 37 contacting in and sliding in the grooves 34. The indicator 40 also has side plates 41, Fig. 6, which tend to contact the internal sides of the tracks 32 opposite the sides in which the grooves 34 are provided. The plates 41 as well as the main parts or frame of the slider 40 are provided with vertically elongated slots 42, Figs. 2 and 5, in which a shaft 43 of an actuating roller 44 is rotatably mounted. The actuating roller 44 has a pair of spaced peripherially knurled or milled disks 45 between which a gear 46 is provided and interconnects said disks 45, the shaft 43, disks 45 and gear 46 being preferably made integral. As shown in Fig. 6 the gear 46 meshes with the rack 33 so that by actuating the knurled edges of the disks 45 by a finger of the operator the slider will travel along the tracks 32. The slider 40 is also provided with a pair of oppositely directed pointers 47 and 48 in the form of sharp pins which are suitably secured to the frame of the slider for the purpose which will be explained.

The indicating instrument is provided with a pair of scales 50 and 51, Figs. 1 and 6, provided in suitable grooves for this purpose in the base plate. The scale 50 is intended to be fixed, for the purpose which will be explained, but the scale 51 is movable and adjustable, which for the latter purpose the scale, in the form of a band, travels in the groove 52, Fig. 6, in the base plate 30 having overlapping sides 53 along the longitudinal edges thereof and is provided with reels or spools 54, Fig. 2, on which the ends of the band are fastened and wound. Each reel 54 on each end of the plate 30, is rotatably mounted in brackets 55 with frictional contact on the adjacent sides and these brackets are suitably secured on the plate 30 by means of screws 56, Fig. 1. Also each reel 54 is provided with a manual actuating knob or wheel 57 and an idler roller 58 each of which is rotatably mounted in a bracket 55 to maintain the band down in the bottom of the groove 52. Upon turning either knob 57 the band 51 may be adjusted, that is by turning the left hand knob 57, Fig. 1, clockwise or the right hand knob counterclockwise each time winding the band or tape 51 on its driving reel in the desired direction and pulling it from the other reel for the purpose which will be explained.

A pair of abutments 59, Figs. 1 and 5, are provided in the base plate 30, one on each side end thereof for the purpose of protecting the pointed ends of the pointers 47 and 38 so that if the instrument is placed or accidently falls on its longitudinal edge on the side adjacent the fastening pins 31 the rather sharp points will not be damaged. Also as seen in Figs. 2 and 5 the marking edge 60 of the pointers 38 and 39 are concave along their longitudinal edge so that the sliders 35 and 36 when brought together against the indicator 40, the end points of the pointers 38 and 47, and 39 and 48, respectively, will all point and indicate as near as possible to a single point or mark.

Each fastening pin 31 is in the form of a push pin 61 mounted in a cylinder 62 secured on each end on the base plate 30. Each pin 61 has an enlarged portion 63 which abuts against the top end of the cylinder 62 and the pin is provided with a spring 64 and a head portion 65. When the instrument is placed on a board or other support it is securely held in place by pushing down the pins 61, but by pulling up on the head portions 65 the instrument is released. As a safety measure, it is desirable to provide an auxiliary pin 66, Fig. 1, fastened to one of the pins 31 by means of a chain 67 whereby upon inadvertent release of the pins 31 the instrument will not fall to the floor assuming that the instrument is used on a board arranged at a slight angle from the vertical.

The instrument according to Figs. 1 to 6 operates as follows, assuming that it is used in connection with a single day's stock market transactions for a particular stock and is used in cooperation with a graph paper; the latter being mounted on a board.

The instrument is first adjusted by setting the pointers 47 and 48, of the slide 40, in the central position so that the pointer 48 will register with the "0" mark 68, Fig. 1, on the permanent scale 50. The slides 35 and 36 are then brought against the center slide 40 so that pointers 38 and 47 as well as 39 and 48 will be adjacent to each other. The instrument is then so placed on the graph paper 69, Fig. 31; on which every vertical line 70 represents the extreme range, high and low prices of a particular day's transactions, and the horizontal lines 71 represent the closing price for the particular day represented by the left hand vertical line; by placing pointers 38 and 47 on the closing price line 72, the longitudinal axis of the instrument being parallel with the lines 70. The instrument is then fastened down by pushing the pins 61 into a board and placing the auxiliary pin 66 in the board above the instrument as a safeguard. The next step is to adjust the movable band 51 so that pointers 48 and 39 will indicate the exact closing price, on the band 51, of the previous day as represented by the line 72. The instrument is now ready for use and as an example, it might be assumed that the pointer 48 is set at "35" which represents the previous day's closing price. The first sale price may be "36" which is recorded by moving the center slide 40 to the right, Fig. 1, by rotating the disks 45 and therewith the gear 46 which, due to the toothed rack 33, will move the slide 40 which is manually stopped when the pointer 48 registers with the "36" line of the scale 51. This movement of the slide 40 will move before it the slide 35 to the right so that its pointer 39 will also point to the "36" line on scale 51. The next transaction is similarly recorded by moving the slide 40 either to the right or left, Fig. 1, depending upon whether the succeeding transactions are higher or lower than the preceding transactions. It is obvious that the pointers 39 and 48 as well as 38 and 47 will indicate the range, high and low, as well as the last transaction at any time, and it can be momentarily observed as to the high and low range and last transaction of that day whereas the pointers 38 and 47 will indicate the same information, but it can be observed in relation to the previous day or day's transactions and said pointers are thus preparing the necessary information to be placed on the permanent record, sheet 69, after the last transaction of the day has been completed. It can, for example, be assumed that the slides 35, 36 and 40 are in the position indicated in Fig. 1 at the close of the day's transactions in which pointers 38 and 39 indicate the high and low prices as a range with the pointers 47 and 48 indicating the closing price. A vertical line 70 is now drawn on the graph paper 69 to indicate the range for the day and a short horizontal line 71 to indicate the last or closing price transaction. It is, of course, obvious that the pointers 38 and 47, or merely 47, can be provided with or may constitute an inking or marking pen so that the permanent lines 70 may be applied or drawn on the sheet 69 as the transactions on the stock exchange are carried out. It is, of course, obvious that this invention may be used with a well known "ticker" transmitter or if desired the transactions may be received by any other suitable means.

The purpose of the slot 42 for the shaft 43 is to permit the disks 45 and gear 46 to be raised so that the latter will not mesh with the rack 33 to move the slider 40 quickly without any rotary action.

The indicator of Figs. 7 to 27 is electrically operated and is mounted on a base plate 73 having uprights 74 and 75 near each end thereof constituting the frame of the instrument. This instrument also has spring pressed push pins 76 at the ends with a safety pin 77 having a suitable length of chain 78 to fasten the instrument on a sheet of paper and board in a manner similar to the instrument of Figs. 1 to 6. A number of bars 79, 80, 81, 82, and 83 are suitably secured to and between the uprights 74 and 75 for the purpose which will be explained. A spirally threaded actuating rod 84 is removably mounted for rotation in the uprights 74 and 75.

The guide bar 82, Figs. 9, 10, and 10a, is mounted and fixed on the base plate 73 and extends approximately along the center axis of the instrument between the uprights 74 and 75. This guide bar 82 is provided with a grove 85, Fig. 9, extending longitudinally in the upper surface of the bar acting as a guide for a tongue 86, Figs. 9 and 23, of a guide and actuating nut 87 threaded on and movable axially by the rotation of the actuating rod 84.

The actuating rod 84 is suitably formed as shown in Fig. 23 in which the major portion of the rod is provided with a spiral thread 88, the pitch of which is determined in relation to the required axial distance it is desired to move the guide nut 87 upon each quarter turn of the rod 84. The left hand end of the rod 84 is provided with a bearing 89 which rotates in a suitable perforation, not shown, in the upright 74, Fig. 10a, and the right hand end has a bayonet lock member 90 rotatably mounted but axially rigid on the rod adjacent the end of the spiral thread 88. The lock member 90 has a lever 91 secured thereon and a pair of diametrically opposite lugs 92 on the periphery thereof which latter cooperate with slots 93, Fig. 10, in the upright 75 to removably lock the rod 84 in the uprights. The lock member 90 thus acts as a bearing for the other end of the rod 84 and by suitably turning the lock member 90, the rod 84 may be withdrawn from the instrument to be replaced by another rod having a different pitch of thread 88. Also at the right hand end of rod 84, Fig. 23, a pair of spaced ratchet teeth on wheels 94 and 95 and a knurled wheel 96 are secured, or made integral therewith, on the extreme end so that the rod 84 may be manually turned, by the wheel 96, and to facilitate removal of the rod from the instrument.

The indicating device is also provided with an adjustable scale ribbon or tape 97, Figs. 10 and 11, which slides in a track in the upper surface of the scale rod 79. Near each end of the rod 79, the tape 97 passes through an opening 98 to a spool or reel 99 each of which is rotatably mounted in side brackets 100 suitably secured on the base plate 73. Each reel 99 is provided with a hand wheel or knob 101 to adjust the tape on the rod 79. As shown in Figs. 10 and 10a, the rod 79 is secured to the uprights 74 and 75 by angle brackets 102.

The rod 80 is merely a reinforcing rod between the uprights 74 and 75, but the rod 81 is an electrical contact rod; and rod 83 is a guide rod for a pair of pointer slides 103 and 104. The electrical contact rod 81 is composed of an insulating base 105, Fig. 15, which is preferably square in cross section and has side strips 106, preferably of brass, secured thereon by screws, and projecting slightly above the upper surface of the insulating base 105 thereby forming guide means for electrical contact strips or ribbons 107 and 108. The ribbons 107 and 108 are preferably made of copper or silver of which the outer end is secured to a U-shaped frame 132 and the other end passes through an opening in the base 105 so that it may spirally curl into a roll 109, Figs. 7 and 7a, so as to be out of the way, said spiral curl being formed by an inherent tendency of the strip to roll up upon itself against the bottom surface of the base 105. The frame 132 has a knurled turning knob 110 rotatably mounted therein with a small gear wheel 111 which latter meshes with a gear rack 112 secured along the underside of the base 105. By turning the knob 110 the extreme end 113 of the ribbon may be adjusted on the rod 81 for the purpose which will be explained, it being seen from Fig. 7 that there are two strips 107 and 108 each with a frame 132 and an actuating knob 110 to thus provide contacts on the rod 81 with two limit edges 113 adjustable together, that is relatively toward and away from each other. It will be noted from Fig. 7 that the side strips 106 are spaced from each other at 114 so as not to short circuit the two contact strips 107 and 108 with each other. Each frame 132 is also provided with lips 115 to frictionally contact the side strips 106 so that any jarring of the instrument will not change the adjusted ends 113 of the contact strips 107 and 108.

The guide rod 83, Figs. 7 and 11, is secured just above the base plate 73 to the two uprights 74 and 75, and is provided with a counter-sunk guide track 116. This guide track 116 is made of steel and is adapted to receive the pointer slides 103 and 104, Figs. 7 and 8, which are made of a magnetic material so that they will adhere to a certain extent to the bottom of the track 116 so that even when the instrument is used on a board which is at a considerable angle relative to the horizontal, the slides 103 and 104 will be maintained in their adjusted or set position, irrespective of the jar of the machine but will nevertheless move with sufficient freedom to any set position. Each slide 103 and 104 is provided with a downwardly extending actuating pin 117 and 118 respectively and a pointer 119 and 120 respectively.

In addition to the pointers 119 and 120, there is an additional lower pointer 121, Figs. 9 and 16, mounted on an arm 122 secured to a curved arm 123, also provided with an upper pointer 124. This arm 123 is removably secured on the cylindrical guide nut 87, Figs. 16 and 23, having a pair of spaced upstanding bosses 125 preferably integral with the nut. The nut 87 is provided with internal spiral threads 126 corresponding to the pitch of the threads 88 on the actuating rod 84. The arm 123 also has a forked lower end 127 cooperating with the integral lip 86, Fig. 10, depending from the nut 87 and the arm 123 with its pointers 121 and 124 is removably secured on the nut by a screw 128, Fig. 16, which latter maintains the arm 123 on the nut by forcing the lower end 127 against the lip 86 and the upper part into the space between the bosses 125 by means of the laterally projecting bar 129. This bar 129 is preferably soldered or welded through a perforation in the arm 123, and the outer end of the bar 129 is provided with two spring contacts 130 and 131 suitably secured thereon and which are adapted to slide on the bar 81 and ultimately on the contact strips 107 and 108 respectively, Fig. 11.

The instrument according to Figs. 7 to 26 is operated electrically by means of a pair of solenoids 133 and 134, Figs. 11a, 14 and 24 to 26, both mounted on a plate 135 secured by screws 136' to the upright 75. Each solenoid is provided with an iron core 136 and 137 connected by means of an arm 138 and 139 respectively to a bell crank lever 140 and 141 respectively. Each bell crank lever is provided with an actuating pawl 142 and 143 of which pawl 142 is adapted to cooperate with the ratchet member 95, and pawl 143 is adapted to cooperate with the ratchet member 94 when the respective solenoid 134 or 133 is actuated to rotate the rod 84 clockwise or counterclockwise as desired. Also each bell crank lever is provided with a lower bent lug 144 and a screw pin 145 forming a pivot for the pawl 142 and 143 with a spring 146 cooperating with the pin 145, the bell crank lever and the pawl to force the latter against the lug 144, Fig. 24. Each pawl 142 and 143 is made in the form of a bell crank lever having an upper arm 147, Fig. 19, with an enlarged head 148 and a lower arm 149 which latter strikes against the lug 144 provided on each of the levers 140 and 141.

Figs. 24 to 26 illustrate the operation of the escapement mechanism when the solenoid 134 is energized to rotate the ratchet wheel 95 and in turn the rod 84 a one-fourth turn clockwise. Figure 24 shows the position of rest but when the solenoid 134 is energized the core 136 is drawn upwardly and rotates the bell crank lever 140 counter-clockwise. During this movement, the head 148 of the pawl 142 strikes under the nearest tooth of the ratchet 95, Fig. 25, thereby imparting a one-fourth turn to the rod 84, the outer straight surface 150, Fig. 26, or the surface 150 of the following tooth striking against the side of the pawl to positively lock the rod 84 against further rotation until the solenoid 134 has been de-energized and the parts of the pawl mechanism returned to the position of Fig. 24. Also the next following tooth of the ratchet 95 may alone or simultaneously contact against the lower arm of the pawl 142 to act as a further check against rotation, so that one or both arms of the pawl 142 may act to lock the ratchet 95 and thereby the rod 84 against further rotation until the respective solenoid has been de-energized.

The detent 151, Figs. 17 and 14, is secured to the side of the upright 75 and cooperates with the locking arm 91 secured on the lock member 90. This detent element 151 has a cam portion 152 and a depressed portion 153 with stop 155 into the depressed portion of which the arm 91 maintains the rod 84 in secure position in the uprights 74 and 75.

Each upright 74 and 75 has a small electric light bulb 156 and 157 mounted in a suitable socket of which the bulb 156 is in circuit with the contact strip 107 and the bulb 157 is in circuit with the contact strip 108.

Fig. 27 shows for purpose of illustration a wiring diagram in which two push button switches 158 and 159 each control one of the solenoids 133 and 134 through a suitable wiring and battery 160 or any other source of current such as a regular 110 volt current with a transformer, not shown. The wires are connected to binding posts 161, 162 and 163 mounted on an insulating plate 164 suitably secured on the upright 74. Each switch 158 and 159 is connected to the battery 160, switch 158 to binding post 162 and solenoid 133 and switch 159 to binding post 163 and solenoid 134. Either light bulbs 156 and 157 in two different colors, if desired, will light when contact 130 slides on strip 107 or when contact 131 slides on strip 108.

Fig. 32 shows the device of Figs. 7 to 26 in combination with a continuous recording means for the center pointer, that is to obtain a precise graphic record of all the fluctuations or prices of the entire day or session of the stock market. The continuous graphic recording device 172 includes a means preferably in the form of a cylinder 173 rotatably mounted in a bearing member 174 at one end, on which a graph paper or sheet may be attached and which upon the slow rotation of the cylinder 173 by the motor 175 a stylus or pen 176 on an arm 177 will record a line 178 representing the sales fluctuations. The stylus 176 is rigidly connected by an arm 179 to the guide and actuating nut 87. It is obvious that the device 172 with its motor may comprise a separate unit or it may be secured to the base 73.

Fig. 33 shows a device for continuously recording the fluctuations on a sheet of paper or graph paper 188. For this purpose a telescoping arm 180 with an inking device 183 is hinged at 182 to the nut 87 and this arm may be of square cross section or may have any other suitable section. A central bar 181 slides in the hollow arm 180 and is provided with a series of notches 185 which cooperate with a spring lug 184 mounted on the arm 180 and projecting through an opening in the arm. A roller 186, preferably of rubber is rotatably mounted on a lever or axle which is pivotally mounted at 187 to the bar 181 and this roller is angularly adjustable relative to the bar 181. Thus the axis of rotation of the hinge is horizontal whereas the axis of rotation at 187 is vertical. By adjusting the roller up or down around 187 determines the character of the angular line which is drawn on the paper sheet 188 by the inking device 183. If for instance the roller 186 is adjusted to the dotted line position upon the travel of the nut 87 downwardly, the roller 186 will pull the bar 181 slowly out of the arm 180 to draw a lateral line to thus indicate a change in price either up or down but upon the nut 87 moving upwardly the spring 184 and a notch 185 will prevent the bar 181 telescoping into the arm 180, the roller merely sliding on the paper and a vertical line will be drawn by the device 183. If however the roller 186 is adjusted in the opposite angular position the angular lines will be drawn when the nut moves upwardly.

The apparatus according to Figs. 7 to 27 operates as follows:

Assuming the machine is mounted on a board on a sheet of graph paper as for instance, 69 of Fig. 31 with the pointers 119, 120 and 121 adjacent each other in the center of the machine and all pointing to the mark 72 which represents in price the last quotation of the previous day or session for a particular stock. At the same time the adjustable tape 97 is set by actuating either one of the hand wheels 101 so that pointer 124 will indicate the closing price as graphically indicated by the mark 72, the tape 97 being provided with a range of figures corresponding to any possible range of prices of the particular stock. Assuming now that the transactions on the Stock Exchange are observed from the well known ticker tape, a transaction for the particular stock appears thereon which is, for instance, at the same closing price, 72 on the graph 69, the machine is not actuated. If, however, the price is higher by "one-half" the "high" button or switch 158 is depressed four times so that the solenoid 133 will be energized four times to impart a complete rotation of the rod 84 to move the pointers 121 and 124 and with them the slide 103 and its pointer 119 four positions equal to four-eighths. Each succeeding transaction of the respective stock is precisely recorded in the machine, and at the close of the day or session, the pointers may, for instance, assume the positions indicated in Fig. 11 in which pointers 121 and 124 indicate the last sale and the pointers 119 and 120 indicate the high and low range reached that day or during that session. To preserve a permanent record, a vertical line 70 is then drawn between the pointers 119 and 120 on the graph paper 69 with a horizontal closing price line 72, the latter point being the position at which the three pointers 119, 120, and 121 are set for the following day or session.

Figs. 24 to 26 illustrate a quarter turn movement of the rod 84 which operation has already been referred to.

Figs. 28 to 30 illustrate an extremely simple manual indicating and recording device which consists of a metallic base plate 164 having a series of perforations 165 near the peripheral edge thereof which are suitably spaced and which serve to mount the plate on a board by means of thumb tacks, not shown. A sheet of graph paper 166 is secured on the base plate by means of the thumb tacks. The indicating and recording devices 167, 168 and 169 each of an elongated pyramid shape as shown in general in Fig. 30, is made of a magnetizable metal so that it will adhere on the paper sheet 166 even though the plate 164 is vertical. Each indicator is provided with a pointed end 170 and a handle 171. The device is used in a manner similar to the instruments described in the previous modifications in that the pointer 168 will indicate the high price, the pointer 167, the low price at any time during a day's session of the stock market. As for instance shown in Fig. 28, the pointers 168 and 167 may indicate the day's high and low prices respectively and the pointer 169 the closing or last price. Lines are then drawn on the graph paper 166 similar to those shown in Fig. 31.

It is of course obvious that the quarter turn of the rod 84 may represent any desired unit or change in price or value. It is also obvious that not all the various details must be conjointly since the various elements may be used in any combination or sub-combinations within the scope of the appended claims. It is also obvious that one machine may be used to precisely record and indicate the prices or fluctuations of more than one particular stock to thus obtain a composite of the stocks in question. If thus for instance two stocks are to be recorded the price change of ½ a point will require only a ½ turn of the rod 84 instead of a complete revolution as in the case with one stock, to thus obtain the average between the two stocks. It might also be explained that the lights 156 and 157 may be used to instantly set up a visual signal to impart the information that a certain predetermined price has been reached which latter might not be immediately ascertained unless a careful observation is maintained on the pointers when a price or sale of the stock comes over the ticker and is set up into the machine. It is of course necessary to set the strips 107 and 108 previous to the opening session of the market and this setting corresponds to the values at which it is desired to make a trade or transaction. The machines may obviously be used in various other ways as may be desired.

I claim as my invention:

1. An indicating device comprising a base plate, a pair of uprights one mounted on each end of the base plate, an actuating rod rotatably mounted in the uprights, means for intermittently rotating said rod in both directions, a guide nut mounted on said rod and having pointer means secured thereto, a track member mounted on the uprights and extending over the base plate, and a pair of pointer slides mounted in said track member and being actuated to slide on the track member by the pointer means, said rotating means for the rod actuating the pointer slides when the guide nut abuts one of the slides by means of the pointer means.

2. An indicating device according to claim 1, in which the means for rotating the actuating rod includes a pair of solenoids and an escapement mechanism on one end of the rod, said solenoids being mounted on one of the uprights and being adapted to actuate the escapement mechanism to intermittently rotate the rod.

3. An indicating device comprising a base plate, a pair of uprights one mounted on each end of the base plate, an actuating rod rotatably mounted in the uprights and having a spiral screw thread around its peripheral surface, a guide nut having internal threads corresponding to the thread on the actuating rod on which it is mounted, said nut also having pointer means secured thereon, a track member mounted on the uprights and extending above the base plate, a pair of pointer slides adapted to slide in the track member and being adapted to be moved by said pointer means of the guide nut, and means for intermittently rotating the rod in both directions to move the guide nut and pointer means longitudinally over the base plate and when either one of said pointer slides abuts against the pointer means on the guide nut the latter will slide the respective pointer slide along the guide track.

4. An indicating device according to claim 3, in which the pointer slides are composed of magnets having means to act as a pointer and means to abut against the pointer means of the nut, said pointer slides being maintained in their adjusted positions in the guide track by magnetic action.

5. An indicating device comprising a base plate, a pair of uprights one mounted on each end of the base plate, an actuating rod rotatably mounted in the uprights, said rod having a spiral thread on its peripheral surface, means for intermittently rotating said rod in both directions, a guide nut mounted on said rod and having pointer means secured thereto, said nut having internal threads therein which mesh with the threads on the rod, a track member mounted on the uprights and extending over the base plate, and a pair of pointer slides mounted in said track member and being actuated to slide on the track member by the pointer means, said rotating means for the rod actuating the pointer slides when the guide nut abuts one of the slides by means of the pointer means.

6. An indicating device comprising a base plate, a pair of uprights one mounted on each end of the base plate, an actuating rod rotatably mounted in the uprights and having a spiral screw thread around its peripheral surface, a guide nut having an internal thread corresponding to the thread on the actuating rod on which it is mounted, said nut also having pointer means secured thereon, a track member mounted on the uprights and extending above the base plate, a pair of pointer slides adapted to slide in the track member and being adapted to be moved by said pointer means of the guide nut, means on one end of the rod for intermittently rotating the rod in both directions to move the guide nut and pointer means longitudinally over the base plate and when either one of said pointer slides abuts against the pointer means on the guide nut the latter will slide the respective pointer slide along the guide track, and means on said end of the rod for manually rotating the rod and moving the nut.

7. An indicating device comprising a base plate, a pair of uprights one mounted near each end of the base plate, an actuating rod rotating in and mounted in the uprights and extending approximately along the center of the base plate, means on one of the uprights and on the rod for intermittently rotating said rod in both directions, a guide nut mounted on said rod and having pointer means secured thereto, said rod and nut having means whereby the rotation of the rod will move the guide nut axially on the rod, a track member mounted on the uprights and extending over the base plate, said track member being mounted on one side of the base plate, a pair of pointer slides mounted in said track member and being actuated to slide on the track member by the pointer means of the guide nut, said rotating means for the rod actuating the pointer slides when the guide nut abuts one of the slides, a bar mounted on and between the uprights parallel with the actuating rod, and a pair of reels mounted in spaced relation on the base plate with a tape provided therewith which is adapted to slide on the bar and wound on the reels and which cooperates with the pointer means on the guide nut.

8. An indicating device according to claim 1, in which a bar is provided secured to and extending between the uprights, said bar having a pair of adjustable metallic ribbons slidable thereon, and in which a contact member is provided on the guide nut adapted to slidably contact the bar to close an electrical connection when the contact member slides on one of the ribbons.

9. An indicating device comprising a base plate, a pair of uprights one mounted on each end of the base plate, an actuating rod rotatably mounted in the uprights and having a spiral screw thread around its peripheral surface, a guide nut having internal threads corresponding to the thread on the actuating rod on which it is mounted, said nut also having a pair of pointers extending in opposite directions, a track member mounted on the uprights and extending above the base plate, a pair of pointer slides adapted to slide in the track member and being adapted to be moved by one of said pointers on the nut, means for intermittently rotating the rod in both directions to move the guide nut and pointers longitudinally over the base plate and when either one of the said pointer slides abuts against the first-mentioned pointer on the guide nut the latter will slide the respective pointer slide along the guide track, and means mounted on the uprights including a scale tape which is adapted to cooperate with the other pointer on the guide nut.

10. An indicating device according to claim 3, in which each pointer slide is in the form of a magnet which by magnetic action adheres frictionally to the guide track so that irrespective of the position of the indicating device the pointer slides will remain in their adjusted positions.

11. An indicating device comprising a base plate having a pair of uprights mounted on each end thereof, an actuating rod rotatably mounted in the uprights, said rod having a spiral thread on its peripheral surface, means for intermittently rotating said rod in both directions, a guide nut mounted on said rod and having pointer means secured thereto, said nut having internal threads therein which mesh with the threads on the rod, a track member mounted on the uprights and extending over the base plate, a pair of pointer slides mounted in said track member and being actuated to slide on the track member by the pointer means, said rotating means for the rod actuating the pointer slides when the guide nut abuts one of the slides by means of the pointer means, and means mounted on the base plate and on the guide nut to prevent rotation of the latter on the actuating rod.

HENRY H. BARNARD.